(12) United States Patent
Mao et al.

(10) Patent No.: US 7,089,579 B1
(45) Date of Patent: Aug. 8, 2006

(54) SYSTEM FOR TRANSPORTING MPEG VIDEO AS STREAMING VIDEO IN AN HTML WEB PAGE

(75) Inventors: Weidong Mao, Princeton, NJ (US); Wayne E Hyatt, Hatboro, PA (US)

(73) Assignee: TVWorks, LLC, Philadelphia, PA (US)

( * ) Notice: Subject to any disclaimer, the term of this patent is extended or adjusted under 35 U.S.C. 154(b) by 447 days.

(21) Appl. No.: 09/455,201

(22) Filed: Dec. 6, 1999

(51) Int. Cl.
  *H04N 7/173* (2006.01)
(52) U.S. Cl. ......................................... 725/109; 725/88
(58) Field of Classification Search ................ 725/120, 725/109–113, 88
  See application file for complete search history.

(56) References Cited

U.S. PATENT DOCUMENTS

| | | | |
|---|---|---|---|
| 5,987,518 A | | 11/1999 | Gotwald |
| 6,118,472 A | * | 9/2000 | Dureau et al. .............. 725/109 |
| 6,266,369 B1 | * | 7/2001 | Wang et al. ................. 375/240 |
| 6,292,490 B1 | * | 9/2001 | Gratacap et al. ............ 370/412 |
| 6,459,427 B1 | * | 10/2002 | Mao et al. .................... 725/109 |
| 2002/0007494 A1 | * | 1/2002 | Hodge ......................... 725/109 |

FOREIGN PATENT DOCUMENTS

| | | |
|---|---|---|
| EP | 0 810 790 A | 12/1997 |
| EP | 0 811 940 A | 12/1997 |
| EP | 0 837 599 A | 4/1998 |
| EP | 0 848 553 A | 6/1998 |
| EP | 0 851 681 A | 7/1998 |
| US | PCT/US96/15465 A1 | 4/1997 |
| WO | WO 99 51030 A | 10/1999 |

OTHER PUBLICATIONS

European Broadcasting Union: "digital broadcasting systems for television, sound and data services;specification for service information (SI) in digital broadcasting (DVB) systems".
European Telecommunication Standard,XX,XX, Oct. 1, 1995, XP002079535 section 4 "Service Information (SI) description", pp. 10-12 Table 6, p. 21 section 5.2.6 "Running Status Table (RST)", p. 25.

* cited by examiner

*Primary Examiner*—Andrew Y. Koenig
(74) *Attorney, Agent, or Firm*—Patterson & Sheridan, LLP (57) ABSTRACT

An implementation of streaming video in HTML (Hypertext Markup Language) Web pages combines video signals in MPEG digital television format with Internet World Wide Web pages in HTML format. Internet streaming video is transcoded into MPEG-2 digital video format and multiplexed along with other MPEG-2 digital video signals for transport within a multiple channel digital video system. A navigational control map, transmitted from the headend to the CATV set-top box in a fixed location i n the MPEG-2 video data steam, permits the CATV set-top to find the requested video clip in a predetermined Packet Identifier of the MPEG-2 data stream. The viewer controls the video clip (e.g., play, pause, resume, restart etc.) during the session. In the two-way embodiment, the set-top transmits control commands to the headend, which implements the command in MPEG-2 video. The disclosed arrangement allows the available MPEG-2 decoder hardware in the CATV set-top box to be used to display streaming video without requiring additional hardware or additional RAM memory.

26 Claims, 5 Drawing Sheets

SYSTEM FOR TRANSPORTING MPEG VIDEO AS STREAMING VIDEO IN AN HTML WEB PAGE

FIELD OF THE INVENTION

The present invention relates to the efficient implementation of streaming video in HTML (Hypertext Markup Language) Web pages. More particularly, the present invention relates to a system for combining video signals in MPEG digital television format with Internet World Wide Web pages in HTML format.

BACKGROUND OF THE INVENTION

Many World Wide Web sites on the Internet host pages which contain streaming video. When the user (viewer) clicks on an icon indicating a video clip, the Web server delivers a digital video data stream representing the requested video clip.

In order to play the streaming video, the video data is typically stored (cached) at the user (client) location, and run using a compatible software plug in module. One well known format for video streaming is Quicktime by Apple Computer Corporation of Cupertino, Calif. USA. Using the Quicktime software decoder, a locally stored video clip may be played, paused, resumed or replayed from the beginning. Streaming video in HTML Web pages has the potential to present video clips lasting several seconds or minutes, or even to feature length movies lasting several hours.

The Quicktime software decoder is adapted to run on a standard compatible PC or an Apple Computer Macintosh. A typical PC uses a central processing unit (CPU) based on a microprocessor from Intel Corporation running the Windows operating system from Microsoft Corporation. The Quicktime software decoder needs a computing environment having substantial resources in terms of hard disk storage, RAM memory and microprocessor speed. For example, a PC equipped to run Quicktime encoded video clips would include a Pentium class Intel microprocessor and substantial RAM memory.

Many households do not have a PC and therefore have limited access to the Internet. However, many households do have a television receiver and access to a cable television (CATV) connection. For those viewers with access to CATV, Internet connectivity can be provided over the CATV system in conjunction with the television receiver. The interface between the CATV subscriber and the CATV system is typically a CATV set-top box.

However, CATV set-top boxes are cost sensitive consumer items that use an inexpensive microprocessor and a minimum of RAM memory. As a result, most CATV set-top boxes are resource poor and ill equipped to locally store or run Quicktime encoded video clips. Video clips larger than the available RAM memory may have to be displayed in segments resulting in a wait period during which successive segments are swapped in memory. The performance of a typical CATV set-top box when running Internet delivered Quicktime streaming video is at times so slow as to be wholly inadequate.

SUMMARY OF THE INVENTION

In accordance with the present invention, Internet streaming video (such as in Quicktime format) is decoded into video and re-encoded (transcoded) into MPEG-2 digital video format at the CATV headend. The streaming video signal transcoded into MPEG-2 format is then multiplexed along with other MPEG-2 digital video signals for transport within a multiple channel digital video system.

The streaming video signal in MPEG-2 format is delivered to the user's location, decoded and displayed in conjunction with a World Wide Web page being viewed. A digital CATV set-top box normally comes equipped with a fast MPEG-2 decoder in dedicated hardware. By use of the present invention, the available MPEG-2 decoder hardware in the CATV set-top box is advantageously used to display streaming video.

By use of the present invention, the client software providing Internet access functions in the CATV set-top box gains the advantages of MPEG-2 compression, better utilization of available CATV bandwidth and fast MPEG-2 decoding using hardware resources available in the CATV set-top box and not requiring additional hardware. In addition, no RAM memory is needed to store the video clip in the CATV set-top box, since the headend provides the video clip in MPEG-2 format.

In a first embodiment of the present invention, streaming video signal in MPEG-2 format is multiplexed along with other MPEG-2 digital video signals for transport within a one way multiple channel digital video system. The one-way embodiment provides minimal control over the playing of the video clip. In a second embodiment of the present invention, streaming video signal in MPEG-2 format is multiplexed along with other MPEG-2 digital video signals for transport within a two way multiple channel digital video system. The two-way embodiment provides full control over the playing of the video clip.

One Way CATV System

A one way system for providing Internet access over CATV is shown in co-pending patent application Ser. No. 09/124,572, filed Jul. 29, 1998 and entitled "DIGITAL TV SYSTEM WITH SYNCHRONIZED WORLD WIDE WEB CONTENT". In the above cited patent application, a rotating carousel of HTML pages is formatted to fit into an MPEG-2 data packet structure. Also shown in the cited patent application is a system of control maps, HPAT (for broadcast) and HEIT (for simulcast) which permit the user to navigate among the rotating carousel of HTML pages formatted into an MPEG-2 data packet structure. The present invention is an extension of the cited patent application to include video clips associated with the broadcast and simulcast Web pages. The associated video clips in MPEG-2 format are also continuously broadcast as a rotating carousel. In addition, the control tables HPAT and HEIT are extended to permit the user to navigate to the desired MPEG-2 video clip.

Two Way CATV System

In accordance with the present invention, video clips in Internet streaming video format are transcoded into MPEG-2 digital video format and cached at the CATV headend. The viewer requests a desired video clip by clicking on an HTML tag in the Web page being viewed. Responsive to the viewer request, a two-way session (between the headend and the CATV set-top box) is established. During the active two-way session, the requested streaming video signal in MPEG-2 format (MPEG streaming video) is multiplexed at the headend along with other MPEG-2 digital video signals for transport within a multiple channel digital video system.

To permit the CATV set-top to find the requested video clip, a navigational control map, called the Session Information Table (SIT) is transmitted from the headend in a fixed location in the MPEG-2 video data steam (defined by a predetermined Packet Identifier (PID)). First, the CATV set-top transmits a session request to the headend. The headend responds by placing the SIT for the session in the predetermined PID, and placing the requested video clips as MPEG-2 packets in a given service ID. A service ID (also known as a program ID) is the equivalent of a channel number. The transmitted SIT contains the address of the CATV set-top and the given service ID of the requested video clip.

After sending a session request, the CATV set-top monitors the predetermined PID of the MPEG-2 data stream looking for a SIT containing its own address. When an address match is found, located SIT is saved in memory in the CATV set-top. The stored SIT identifies the service ID where the MPEG-2 video clip is located in the MPEG-2 video stream. The video clip is then displayed at the viewer's location using the MPEG-2 decoder in the CATV set-top.

The two-way CATV system is further used to permit the viewer to control the video clip (e.g., play, pause, resume, restart etc.) during the session. A command is transmitted from the CATV set-top to the headend, e.g., a "PAUSE" command. At the headend, the video is paused, and a new Session Information Table (SIT) is transmitted to confirm the change in running status. The multiplexed MPEG-2 video shows a freeze frame in PAUSE mode. Advanced features such as fast forward and reverse are implemented.

DETAILED DESCRIPTION

Figure 1:
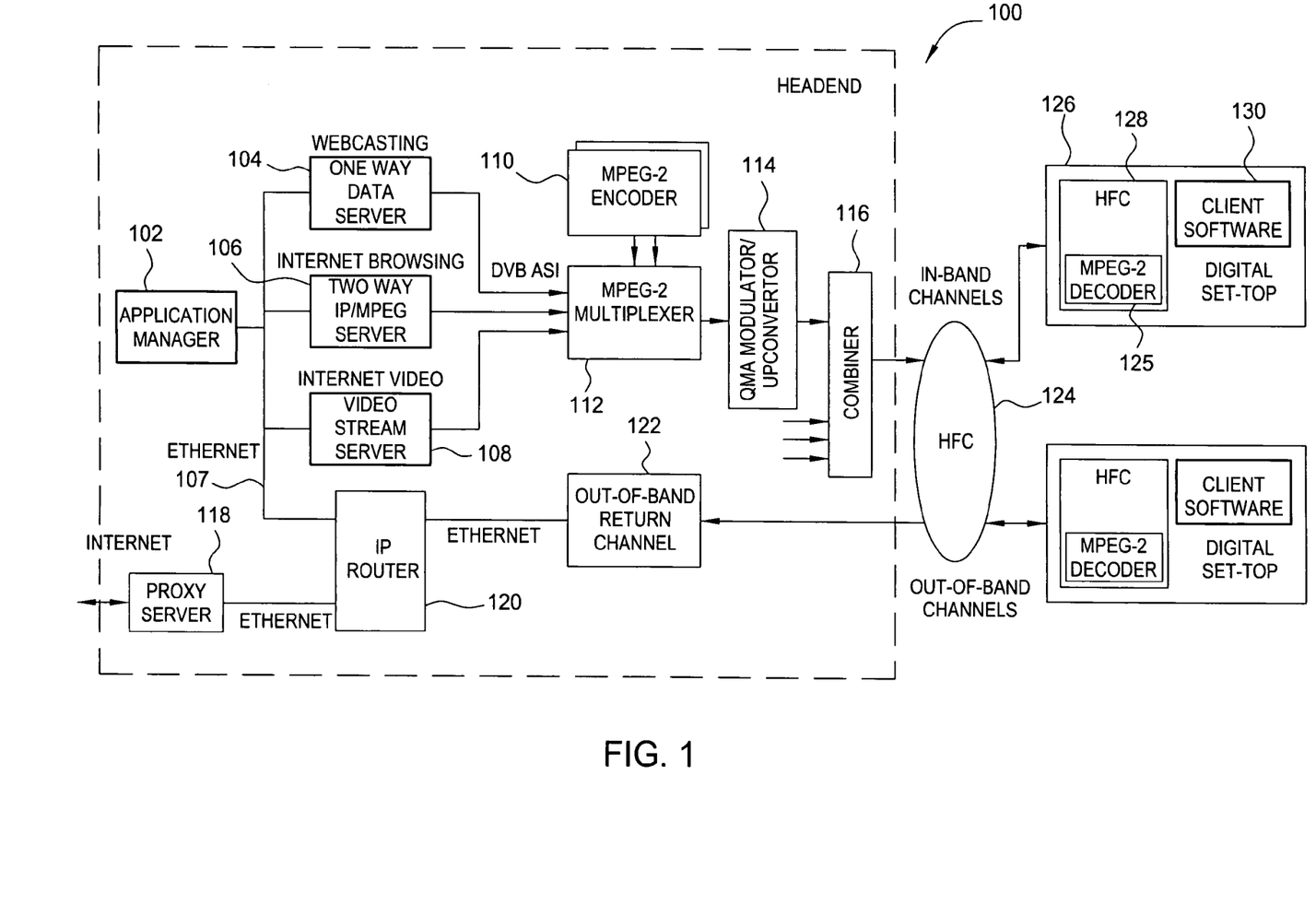
FIG. 1 is a block diagram of a CATV headend in an overall system in accordance with the present invention.

A CATV headend 100 in FIG. 1 includes a computer programmed as an applications manager 102, connected via a local area network 107 (such as an Ethernet network) to three other computers programmed as servers. One server is a one way data server for Webcasting 104. Another server is a two-way IP/MPEG server 106 for Internet browsing, and a third server is a video stream server 108 for conducting video streaming sessions and storing Internet Video. The output of the servers 104, 106, 108 are combined in an MPEG-2 multiplexer 112 along with other MPEG-2 signals from MPEG-2 encoders 110 to form an MPEG-2 data stream to a QAM modulator and upconverter 114. The output of the QAM modulator and upconverter 114 is combined 116 with other broadband signals and transmitted on a hybrid fiber coaxial (HFC) two-way broadband CATV distribution system 124. CATV headend 100 in the one-way embodiment may also be implemented by other one-way broadcast technologies, such as satellite or terrestrial broadcast and the like.

Each of a plurality of digital set-tops 126 is coupled to the HFC network 124, which may also be any broadcast medium compatible with the broadcasting station (headend 100). Each of the plurality of digital set-tops 126 contains an HFC interface module 128, an MPEG-2 decoder 125 and client software 130 for providing set-top functionality. The client software 130 is downloadable from the headend 100 via the HFC network 124. In such manner, software updates and additional functions for the set-top may be downloaded from the headend.

Return path signals from the set-top 126 through the HFC network 124 is received at the headend 100 in a receiver 122 tuned to the out of band return channels. The headend 100 is also connected to the Internet via a proxy server 118, coupled to an IP router 120, which via the local area Ethernet network 107 provides TCP/IP connectivity between the headend video servers 104, 106, 108 and the out of band return channel receiver 120. Proxy server 118 is an Internet access server, which provides access to Internet World Wide Web pages in HTML format in the headend 100.

For two-way systems, all three headend data servers 106, 108 and 104 implement the two-way embodiment of the present invention. For one-way systems, data servers 104 and 108 implement the one-way embodiment of the present invention.

One Way System Architecture

In the above cited pending patent application, HTML page data is formatted to fit within the standard MPEG-2 data packet structure and multiplexed along with other MPEG-2 digital video signals for transport within a multiple channel digital video system. In such manner, the Internet HTML protocol is preserved, and mapped to the MPEG-2 transport format, resulting in HTML in an MPEG video channel.

By way of brief review of the one-way system (more fully described in the above-cited patent application), the headend server broadcasts a rotating carousel comprising an ensemble of Web pages in HTML format. The rotating carousel contains both broadcast Web pages and simulcast Web pages. Broadcast Web pages are of general interest to all viewers. Simulcast Web pages are related to the contents of the broadcast video programs contained in the digital video channels. Simulcast Web pages are of interest primarily to those viewing the related broadcast video program.

Navigation Amoung Web Pages in the Rotating Carousel

To permit the viewer to navigate among the broadcast or simulcast HTML Web pages, in the above cited application, a control map is broadcast in the MPEG-2 data stream. The control map consists of three types of tables. The first table is a master control map, in that the first table defines the locations of the second and third tables. The first table is termed the HTML Program Association Table or HPAT. The second and third tables respectively, are termed the HTML Program Map Table (HPMT), and the HTML Event Information Table (HEIT). The HTML Program Map Table contains the location of HTML Web pages in the rotating carousel that correspond to broadcast Web pages. The HTML Event Information Table contains the location of the HTML Web pages in the rotating carousel that correspond to simulcast Web pages. There is one HTML Event Information Table (HEIT) for each video channel, which HEIT associates at least one simulcast Web page in the rotating data carousel with that video channel.

First, the MPEG-2 decoder in the set-top is synchronized with the MPEG-2 data stream as is normally done in MPEG-2 decoding. Then the set-top looks for and downloads the HTML Program Association Table, which is found in a predetermined data packet within the MPEG-2 data stream format. The set-top then uses the HTML Program Association Table to locate, download and store the other two tables, HPMT and HEIT. After the first, second and third tables are downloaded and stored, the set-top is responsive to viewer commands to navigate through the broadcast Web pages, or the simulcast Web pages of the continuous rotating carousel.

Broadcast Web Pages

Broadcast Web sites are popular sites that are of interest to all viewers. Typical broadcast Web sites contain news, weather and sports, but can be any Web site of general interest to many viewers. The viewer selects an available broadcast Web site from a menu displayed on the TV.

To view a broadcast Web site such as the http://www.NYTimes.com, the HTML Program Map Table is used as a lookup table to find the MPEG-2 data packet within the MPEG-2 data stream corresponding to the NY Times web page. Location within the MPEG-2 data stream is defined by a packet identifier (PID), a table identifier (tableID) and table identifier extension (tableIDext). The set-top monitors the rotating carousel until the designated MPEG-2 data packet location appears and then the HTML page data at that location in the MPEG-2 data stream is stored in the subscriber's set-top and displayed on the television screen.

The home page at NYTimes.com will typically display links to other pages by designating a URL. As is normal for Internet navigation, the user clicks on, (or otherwise indicates a desire to select) a displayed link to another Internet page. To find the linked HTML pages, the designated URL is looked up in the HTML Program Map Table, which provides the location of the desired HTML page in the MPEG-2 data packet within the MPEG-2 data stream corresponding to the designated URL web page. The rotating carousel will normally contain all or most of the linked page URLs. As indicated, a location within the MPEG-2 data stream is defined by a packet identifier (PID), a table identifier (tableID) and table identifier extension (tableIDext). The set-top monitors the rotating carousel until the designated MPEG-2 data packet location appears and then the HTML page data at that location in the MPEG-2 data stream is stored and displayed.

Simulcast Web Pages

To view a simulcast Web site such as http://www.toyota.com, during a Toyota commercial, the HTML Event Information Table for the corresponding video channel is used as a lookup table to find the MPEG-2 data packet within the MPEG-2 data stream corresponding to the Toyota web page. The set-top monitors the rotating carousel until the designated MPEG-2 data packet appears which is then stored and displayed. The content of the HTML Event Information Table is synchronized to the broadcast video program.

Whereas the available broadcast Web pages are changed relatively infrequently (by changing the content of the HPMT) the available simulcast Web pages are changed (by changing the content of the HEIT) relatively frequently, whenever the corresponding broadcast video program changes.

The home page at Toyota.com will typically display links to other pages by designating a URL. As with broadcast web pages, links to other URLs in simulcast web pages are looked up in the appropriate table. In the case of simulcast Web pages, the HTML Event Information Table, HEIT is used to find the linked HTML pages. The designated URL is looked up in the HEIT table, which provides the location of the desired HTML page in the MPEG-2 data stream corresponding to the designated URL web page. As indicated above, the set-top monitors the rotating carousel until the designated PID, tableID and tableIDext appears in the MPEG-2 data stream, and then the HTML page data at that location in the MPEG-2 data stream is stored and displayed.

The content of the HTML Event Information Table defines the links between broadcast video programs and related Web sites. Broadcast video may have advertising and/or entertainment content, and a video broadcast program content provider may be either a programmer and/or an advertiser. The event information and its relationship to locations on the World Wide Web is obtained in individual communications sessions at the broadcasting station established over the Internet and then down loaded into each set-top through the HTML Event Information Table. In particular, in the case of CATV, the headend communicates with the individual web sites of each broadcast video content provider to obtain the relationship between broadcast video program content and corresponding web pages in the rotating carousel.

Figure 2:
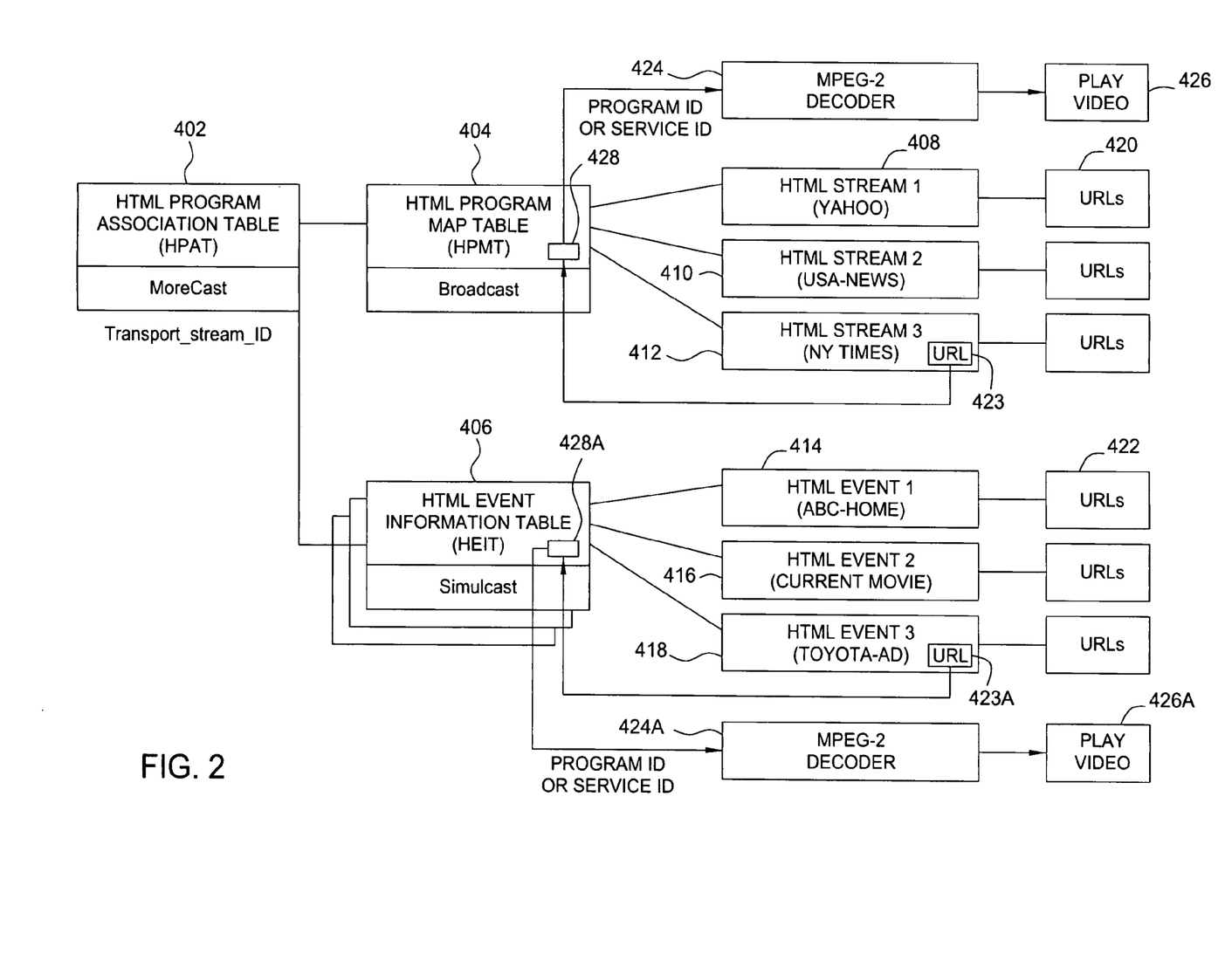
FIG. 2 is a block diagram of the navigational control map architecture in a one-way CATV system in accordance with the present invention.

The relationship between the various tables of the control map to the broadcast and simulcast Web pages is illustrated in FIG. 2. The HPAT 402 is the control map of control maps in that the HPAT 402 locates the other two control maps, HPMT 404 (for broadcast Web pages) and HEIT 406 (for simulcast Web pages).

The HPMT 404 designates a plurality of broadcast Web pages within the rotating data carousel, such as Yahoo 408, USA-News 410 and NY times 412. Each of the designated broadcast Web pages contain other URLs 420 as links to other Web pages.

The HEIT 406 designates a plurality of simulcast Web pages within the rotating data carousel, such as ABC-home, 414, a current movie home page 416 and a Toyota ad 418. Each of the designated simulcast Web pages contain other URLs 422 as links to other Web pages.

Some of URLs 423, 423A contained in broadcast and simulcast Web pages represent streaming video content. In the case of a broadcast Web page 412, the HPMT broadcast table 404 is used to lookup a service ID 428. The service ID 428 directs the MPEG-2 decoder 424 to the location in the MPEG-2 data stream where the desired streaming video 426 is located. In the case of a simulcast Web page 418, the HEIT simulcast table 406 is used to lookup a service ID 428A. The service ID 428A directs the MPEG-2 decoder 424A to the location in the MPEG-2 data stream where the desired streaming video 426A is located.

Figure 3:
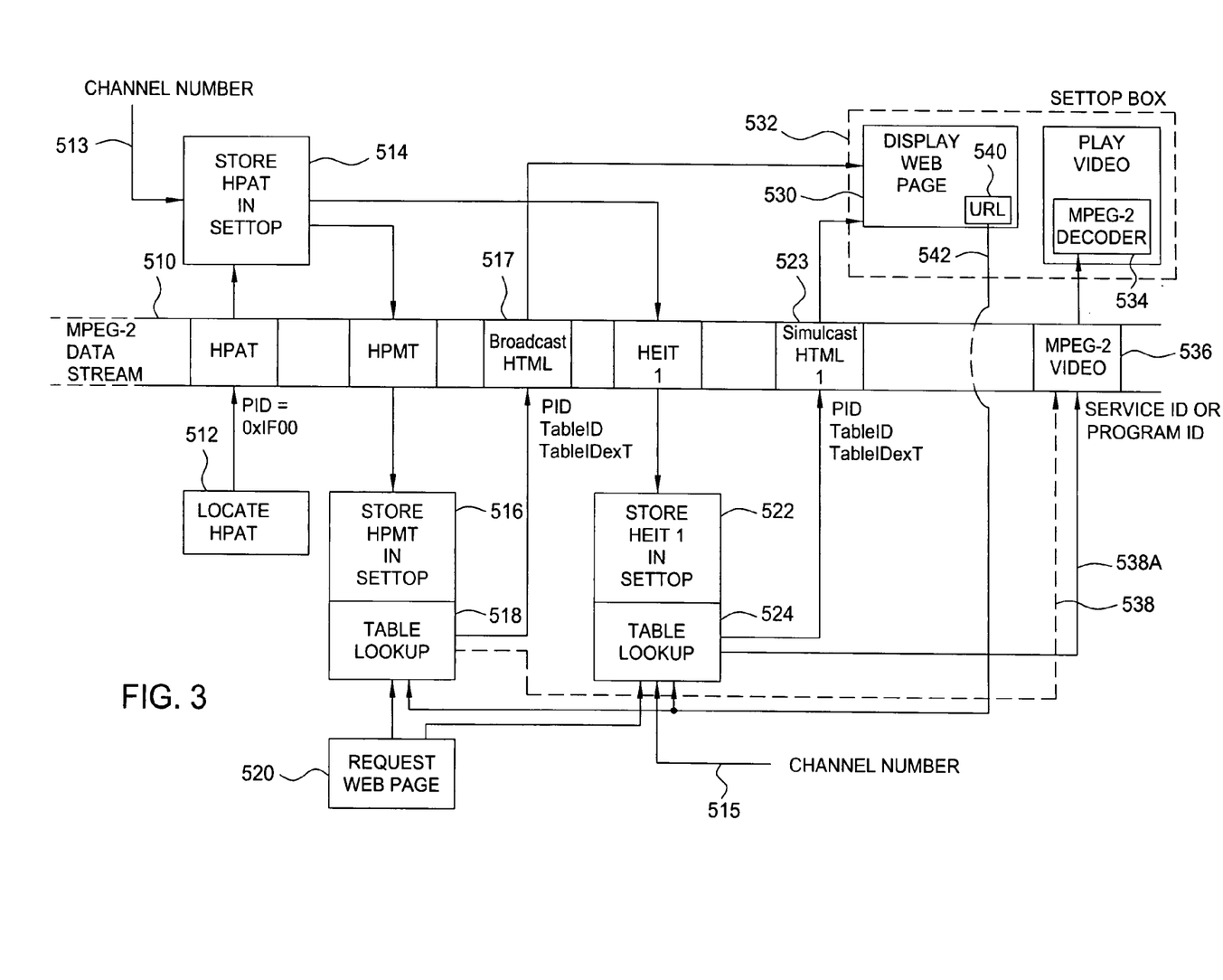
FIG. 3 is a timing diagram, partially in block form, illustrating a system for navigating among HTML pages and steaming video formatted into an MPEG-2 stream in a one-way CATV system in accordance with the present invention.

The navigation in the set-top provided by the control maps HPAT and HEIT to find a desired Web page within the MPEG-2 data stream is illustrated in FIG. 3. In particular, within the MPEG-2 data stream 510, there is a desired broadcast Web page HTML 517, a desired simulcast Web page HTML 523 and a desired video clip 536 in MPEG-2 format.

To navigate to the desired Web page HTML 517, the set-top first finds the HPAT (at a predetermined MPEG-2 location, for example, PID=0x1f00) at step 512. The HPAT is then stored in the set-top at step 514. The set-top uses the HPAT to locate the HPMT and stores the located HPMT at step 516. In response to a broadcast Web page request 520, a table lookup function 518 finds the PID, tableID and tableIDext needed to locate the desired broadcast HTML Web page 517 in the rotating data carousel of the MPEG-2 data stream. The located broadcast HTML page 517 is stored in the set-top and displayed 530. The maximum latency of the system to find a given HTML Web page is the amount of time it takes the rotating carousel of HTML Web pages to repeat itself.

For simulcast, the set-top uses the stored HPAT (in step 514) together with the current channel number input 513, to locate the necessary HEIT. In this case, HEIT 1 corresponds to the simulcast Web pages relating to the current channel number being viewed. The located HEIT 1 is then stored in the set-top at step 522. All the other HEITs, for which there is one simulcast channel, are similarly located and stored.

In response to a simulcast Web page request 520, a table lookup 524 finds the appropriate PID, tableID and tableIDext in the stored HEIT 1, needed to locate the desired simulcast HTML 1 Web page 523 in the rotating data carousel of the MPEG-2 data stream. The located HTML simulcast page 523 is stored in the set-top and displayed 530.

The content of simulcast HTML 1 Web page corresponds to the current channel being viewed. The current channel number is input 515 to the table lookup step 524. Each simulcast channel has one corresponding HEIT.

As indicated, the located broadcast HTML page 517 or simulcast Web page 523 is stored in the set-top and displayed 530. For either broadcast or simulcast, the displayed Web page 530 may contain a URL 540 corresponding to a video clip 536. In response to clicking on the URL 540 for broadcast streaming video, the table lookup function 518, finds the stored service ID (program ID) 538 in the HPMT table 516 needed to locate the desired broadcast MPEG-2 video clip 536 in the MPEG-2 data stream 510. In response to clicking on the URL 540 for simulcast streaming video, the corresponding table lookup function 524 finds the stored service ID (program ID) 538A in the HEIT 1 table 522 needed to locate the desired simulcast MPEG-2 video clip 536 in the MPEG-2 data stream 510. In either case, the located MPEG-2 video clip 536 is applied to the MPEG-2 decoder 534 and displayed as video.

Each MPEG-2 video clip 536 is transmitted continuously in an endless repeating loop. Several options exist for user control over the display of the video clip 536. The simplest option is to tune to the continuously broadcast MPEG-2 video clip 536 as soon as possible after clicking on the URL 540, even though the video clip display will be starting at some random point. By tuning in immediately, the video clip 536 will appear with minimum latency of about 3 seconds or less. The viewer can wait until the video clip runs from the beginning to view the entire video clip, or may discontinue viewing the video clip after reaching the random point where the viewer first began playing the video clip 536.

A second option is to provide timing information either in the control tables 516, 522 or the MPEG-2 video 536 to indicate the start of video clip. The set-top box then waits until the beginning of the video clip 536 before activating the MPEG-2 decoder 534. The maximum latency of the system to find the beginning of a given MPEG-2 video clip is the length of time it takes for the MPEG-2 video clip 536 to repeat itself.

To reduce the latency, multiple delayed versions of the MPEG-2 video clip 536 are transmitted continuously in multiple endless repeatedly loops. Multiple repeating loops of MPEG-2 video clips trade off bandwidth for shorter latency time in beginning each video clip. For example, transmitting four multiple delayed versions of the video clip 536 will use four times the amount of bandwidth, but will also reduce the maximum latency by a factor of four.

Multiple delayed versions also permit limited advanced control functions, such as SKIP, REWIND, and the like. The later advanced control functions are achieved by navigating among the multiple delayed versions of the video clip 536.

Figure 4:
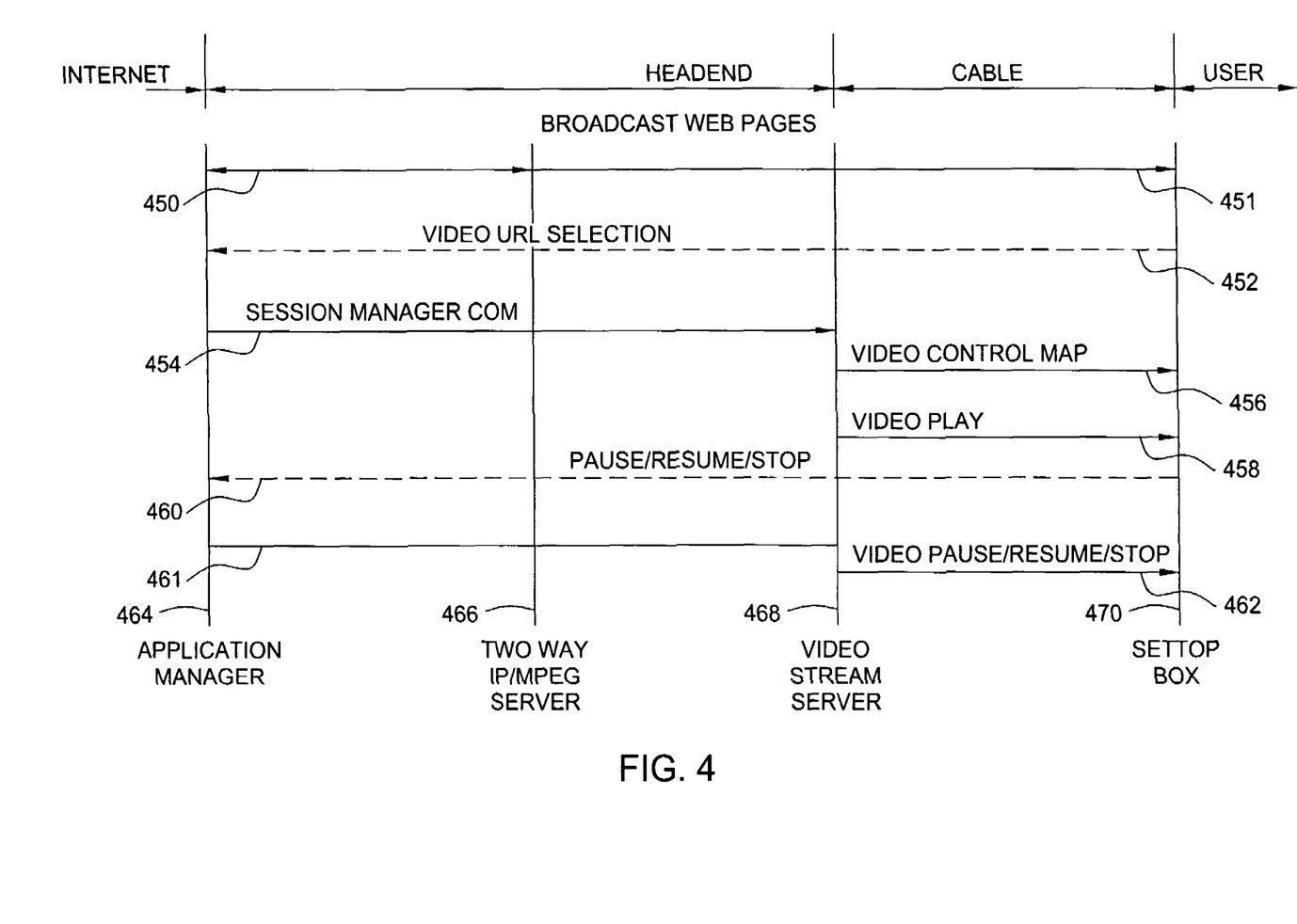
FIG. 4 is a timing diagram illustrating the operation of a two-way CATV system embodying the present invention.

The operation of a two-way CATV system embodying the present invention is illustrated in the timing diagram of FIG. 4. The system consists of four computing entities. At the headend there is an application manager 464 (102 in FIG. 1), a two way IP/MPEG server 466 (106 in FIG. 1) and a video stream server 468 (108 in FIG. 1). The set-top 470 (126 in FIG. 1) is at the viewer (user) location. In FIG. 4, various messages are exchanged between the four computing entities 464, 466, 468, 470.

In operation, a Web page from the Internet is cached by the application manager 464, forwarded 450 to the two way IP/MPEG server 466 and transmitted 451 over the CATV system (HFC) to the CATV set-top 470. In the two-way embodiment, Web pages are transported using the DVB standard for TCP/IP over MPEG cable See section 7 of the European Broadcasting Union DVB specification EN 301 192 v1.1.1, published by the European Standards Institute (1997) for a description of the TCP/IP over MPEG cable standard. However, the Web page 450 may also be broadcast as part of a rotating carousel of HTML Web pages, as more fully described in the above cited pending patent application.

When the user selects a URL representing streaming video in the Web page being viewed, the selected URL is transmitted 452 back to the application manager 464 in a session request. Return path transport is standard TCP/IP over MPEG cable. The application manager establishes a communication (COM) session and sends a message 454 to the video stream server 468 which transmits a video control map 456 to the set-top 470. The video control map 456, also called the Session Information Table, or SIT, is broadcast in a predetermined PID of the MPEG-2 data stream, and addressed to a specific set-top 470 by the tableIDext field. That is, all set-tops use the same PID to transport the control map (SIT) but use the tableIDext field to filter out the right address. At substantially the same time or shortly thereafter, regular MPEG-2 video 458 corresponding to the requested video clip is transmitted to the set-top 470.

The URL in the session request 452 represents streaming video. If the application manager 464 has not recently cached streaming video for the URL in the session request at the headend, the Internet access server (proxy server 118 in FIG. 1) retrieves the desired streaming video from the designated URL on the Internet. The added or updated streaming video for that URL is cached in the proxy server, transcoded into MPEG-2 video format and stored in the application manager 464. The proxy server and the application manager 464 operate to cache streaming video at the headend, thus storing Internet streaming video content closer to the user.

The viewer at the set-top box 470 location controls the play of the video clip by selecting (clicking on) an action control icon, such as PLAY, PAUSE, RESUME etc. The viewer's control action is transmitted back 460 to the application manager 464, which modifies the running status of the COM session to reflect the viewer's selected control action. In accordance with the new running status, the application manager 464 sends a new communication (COM) message 461 to the video stream server 468 which transmits a modified SIT control map 462 to the set-top 470. For example, from the SIT table definition below, if PAUSE was selected, the running status is change to equal 4 (PAUSE).

The modified control map 462 reflects the new running status of the video clip. The video play 458 (in MPET-2 digital packet format) is also modified to correspond to the viewer's selected control action. Continuing the above example, if PAUSE was the selected action, the video play 458 corresponding to the selected video clip shows a stop action video still picture, thereby simulating a paused video clip.

The attributes for a session are described in the following tables. The basic functions provided by the COM Interface are add session, delete session, pause session and resume session. The COM interface and Session Information Table are given below.

TABLE 1

Definition of Session (COM Interface)

| Field | Data Type | Assigned by | Comments |
|---|---|---|---|
| SessionID | int32 | Server | Unique ID generated by the application server for each request. The sessionID can be reused once the session end time is reached. At each time, the sessionID is unique across all the sessions per head-end. |
| SessionType | int8 | Server | Type of session: Use "1" for Video clip session |
| ClientID | int32 | Client | 4 byte (32 bit) IP address of the set-top. Application server obtains this from proxy server and client. |
| ClientAddress | int64 | Client | 6 byte (48 bit) MAC address of the set-top. Pre-assigned by operator and known by the application server. The mapping of IP address to MAC address is also known by the application server. |
| VideoUrlName | char** | Provider | The name of the video URL. Currently, each URL name is less than 255 bytes and /0 terminated. In Video clip case, only one video URL name is allowed. |
| VideoFileName | Wchar* | Server | File name of the video stream. There is one to one correspondences between the URL and file name. In Video clip case, only one video URL file name is used and it is cached ahead of time in broadcast streaming |

TABLE 2

Video Control Map Definition (Session Information Table)
Structure of the Video clip Control Map (SIT)

| Syntax | No. of Bits | Value |
|---|---|---|
| Session_Information_Section( ) | | |
| { | | |
| tableID | 8 | "0x3E" |
| section_syntax_indicator | 1 | "1" |
| "0" | 1 | |
| reserved | 2 | "11" |
| section_length | 12 | section maintained |
| clientAddress_6 | 8 | user defined |
| clientAddress_5 | 8 | user defined |
| reserved | 2 | "11" |
| version_number | 5 | user defined (s) |
| current_next_indicator | 1 | "1" |
| section_number | 8 | section maintained |
| last_section_number | 8 | section maintained |
| clientAddress_4 | 8 | user defined |
| clientAddress_3 | 8 | user defined |
| clientAddress_2 | 8 | user defined |
| clientAddress_1 | 8 | user defined |
| sessionID | 32 | user defined |
| sessionType | 8 | user defined |
| clientID | 32 | user defined |
| serviceID | 16 | user defined |
| duration | 32 | user defined |
| runningStatus | 8 | user defined |
| urlName | variable | user defined |
| CRC_32 | 32 | section maintained |
| } | | |

Figure 5:
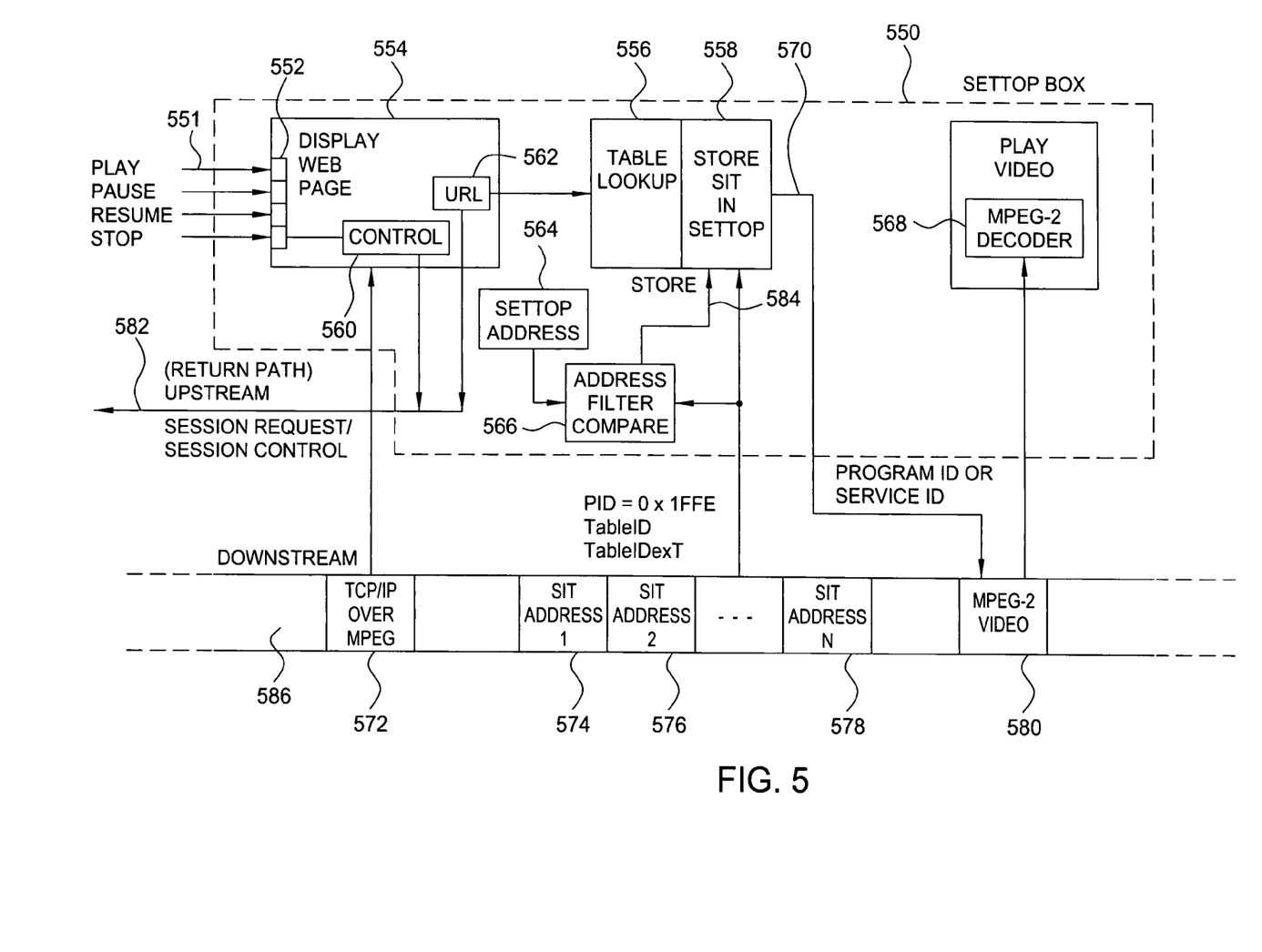
FIG. 5 is a timing diagram, partially in block form, illustrating a system for navigation to locate steaming video formatted into an MPEG-2 stream in a two-way CATV system, including a block diagram of a CATV set-top box in accordance with the present invention.

Notes:
1. tableID: use default value of 0x3E.
2. client_Address_6: last byte of client MAC address
3. client_Address_1: first byte of client MAC address
4. serviceID: a list of serviceID and its associated PIDs are predetermined in a configuration file.
5. duration: the duration of the remaining time of the complete video clip in second
6. runningStatus: the status of the video session:
"0": Begin (beginning of the session, and playing of the video)
"1": End (end of the session, and stopping of the video)
"2": Start (start playing video from the beginning)
"3": Play (normal play from the current position)
"4": Pause (pause at the current position, set-top shows freeze frame)
"5": Stop (stop at the current position)
"6": Fast Forward
"7": Fast Reverse
"8": Skip Forward
"9": Skip Backward
"10": Time out The block diagram portion of FIG. 5 shows a set-top decoder 550 for implementing the foregoing navigation scheme. FIG. 5 is also in part a timing diagram illustrating how the set-top 550 navigates the MPEG-2 data stream 586 to locate the specific service ID 570 corresponding to the desired MPEG-2 steaming video 580.

The CATV set-top box 550 includes the capability for displaying a Web page 554. The displayed Web page 554 is typically obtained via TCP/IP over MPEG packets 572 as described in the above cited DVB standard for TCP/IP over MPEG cable. Set-top 550 is also addressable and stores a unique set-top address 564 for the purpose of conducting video clip sessions. Addressable communication with the set-top 550 is implemented by an address filter 566 which compares the set-top address 564 with incoming messages in an addressable data stream containing set-top addresses, and provides a match 584 indicating when a message addressed to this particular set-top 550. The set-top 550 further includes memory 558 for storing the SIT table and a table lookup function 556 for finding table entries based on a given URL 562. Finally, the set-top 550 includes a hardware based MPEG-2 decoder 568 for decoding and displaying MPEG-2 encoded digital video.

Web page 554, which includes a URL 562 for streaming video typically has a control menu 552 with anchors for selecting video clip controls such as PLAY, PAUSE, RESUME or STOP, which permit the viewer to control the display of the streaming video.

In operation, the set-top 550 generates video clip session requests 582. Specifically, in response to the user selecting a video clip URL 562, a return path message 582 is formatted in standard http protocol (hypertext transfer protocol)

using standard TCP/IP over MPEG cable and transmitted upstream to the headend. At a minimum, the return path message 582 includes the identity of the set-top box (set-top address 564 or a serial number), the URL 562 of the desired video clip and a video clip control command 552, such as a PLAY command 551.

In response to the video clip session request 582, a SIT table for this particular set-top address 564 is placed in a predetermined location in the MPEG-2 data stream 586. In particular, the PID carrying the SIT is defined as 0×1FFE. Each set-top that has an active video clip session in progress is assigned a separate SIT.

All set-tops in the CATV system use the same PID for delivery of each respective SIT control map 574, 576, 578. Each set-top uses one of the tableIDext fields of PID=0× 1FEE as an address to filter out the respective SIT. In particular, PID 0×1FFE includes a plurality of SIT tables 574, 576, 578 addressed to different set-tops in the CATV system. When the SIT addressed for this particular set-top 550 is encountered in the MPEG-2 data stream 586, the address filter comparator 566 indicates a match 584, which stores the received SIT in memory 558.

After the SIT table is stored 584 in memory 558, the URL 562 of the video clip is used as the input to a table lookup function 556. The SIT table contains the service ID where the MPEG-2 encoded video clip 580 is located in the MPEG-2 data stream 586. The MPEG-2 decoder 568 is directed to select and display the located video clip 580. Since the control status is PLAY, the headend renders video clip 580 as active motion.

If the viewer then selects a different command 552, such as PAUSE, then the control program module 560 generates a new video clip session control request 582 using standard HTTP protocol in TCP/IP over MPEG cable. The headend confirms the change in running status by setting the running status equal to 4 in the SIT table for set-top 550, and downloading the updated SIT table by addressable message as above. In addition, the headend implements the video clip control action by pausing (displaying a freeze frame) the MPEG-2 video program 580 in the MPEG-2 data stream 586. The latency of the play, stop, pause and resume control actions for a two-way network should not exceed 3 seconds. Advanced control functions include fast forward, fast reverse, skip forward, skip reverse and time out.

What is claimed is:

1. In a broadcast communication network including a broadcasting station for transmitting on a broadcast medium, and a set-top decoder coupled to said broadcast medium, said broadcasting station including an Internet access server for retrieving World Wide Web pages, wherein at least a given World Wide Web page contains a given URL corresponding to streaming video in a first data format, said broadcast communications network further including a multi-channel digital television signal, each program channel of said multi-channel digital television signal being identified by a respective program ID, a method for displaying said given World Wide Web page containing said streaming video at said set-top decoder, said method comprising:

receiving digital data in a standard Internet Protocol over the Internet, said digital data being derived from said given World Wide Web page associated with said streaming video;

dividing said digital data in said standard Internet Protocol into a plurality of digital data packets while preserving said standard Internet Protocol;

mapping said plurality of digital data packets to the MPEG data packets of an MPEG data stream;

storing said streaming video in said first data format corresponding to said given URL at said broadcasting station;

transcoding said streaming video from said first data format into an MPEG digital video format at said broadcasting station to form MPEG streaming video;

transmitting said MPEG data packets in said MPEG data stream over said broadcast communication network;

transmitting said MPEG streaming video in said MPEG digital video format in a given program ID of said multi-channel digital television signal over said broadcast communication network; and at said set-top decoder, receiving said multi-channel digital television signal;

receiving said MPEG data stream containing said MPEG data packets and said plurality of digital data packets at said set-top decoder to recover said digital data in standard Internet Protocol;

displaying said digital data in standard Internet Protocol at said set-top decoder, said digital data corresponding to said given World Wide Web page containing said given URL;

selecting said given URL;

selecting, responsive to selection of said given URL, said given program ID corresponding to said MPEG streaming video; and displaying said MPEG streaming video corresponding to said given program ID, whereby said digital data corresponding to said given World Wide Web page is broadcast in said standard Internet Protocol format, and said streaming video portion corresponding to said given World Wide Web page is broadcast in said MPEG digital video format.

2. A network method in accordance with claim 1, wherein said multi-channel digital television signal is formatted into a plurality of MPEG data packets, said method further comprising:

generating a control map defining the correspondence between said given URL and said given program ID;

formatting said control map into said MPEG data packets; and at said set-top decoder, receiving said MPEG data packets including said control map; and selecting said program ID from said control map corresponding to said given URL.

3. A network method in accordance with claim 2, wherein said control map further comprises a first table and a second table, each of said plurality of MPEG data packets being identified by a respective packet identifier, said method further comprising:

transmitting said first table in an MPEG data packet corresponding to a predetermined packet identifier; and transmitting said second table in an MPEG data packet having a packet identifier specified in said first table said second table defining the correspondence between said given URL and said given program ID.

4. A network method in accordance with claim 3, further comprising:

receiving said first table in said MPEG data packet corresponding to said predetermined packet identifier;

receiving said second table in said MPEG data packet having said packet identifier specified in said first table; and selecting at said set-top decoder, responsive to said second table, said given program ID.

5. A network method in accordance with claim 2, wherein said broadcast communication network includes a return path communication channel from said set-top decoder to said broadcasting station, and wherein said given World Wide Web page further contains a control icon corresponding to a change in running status of said MPEG streaming video, said method further comprising:

transmitting a request from said set-top decoder to said broadcasting station on said return path communication channel to change the running status of said MPEG streaming video;

generating a revised control map at said broadcasting station, said revised control map defining the correspondence between said given URL and said given program ID containing said MPEG streaming video having a changed running status;

formatting said revised control map into said MPEG data packets; and at said set-top decoder;

receiving said MPEG data packets including said revised control map; and selecting, responsive to said revised control map and responsive to said given URL, said program ID corresponding to said MPEG streaming video having a changed running status for display.

6. In a broadcast communication network including a broadcasting station for transmitting on a broadcast medium, and a set-top decoder coupled to said broadcast medium, said broadcasting station including an Internet access server for retrieving World Wide Web pages, wherein at least one a given World Wide Web page contains a given URL corresponding to streaming video in a first data format, said broadcast communications network further including a multi-channel digital television signal, each program channel of said multi-channel digital television signal being identified by a respective program ID, a method for transmitting said given World Wide Web page containing said streaming video to said set-top decoder, said transmitting method comprising:

receiving digital data in a standard Internet Protocol over the Internet, said digital data being derived from said given World Wide Web page associated with said streaming video;

dividing said digital data in said standard Internet Protocol into a plurality of digital data packets while preserving said standard Internet Protocol;

mapping said plurality of digital data packets to the MPEG data packets of an MPEG data stream;

storing said streaming video in said first data format corresponding to said given URL at said broadcasting station;

transcoding said streaming video from said first data format into an MPEG digital video format at said broadcasting station to form MPEG streaming video;

transmitting said MPEG data packets in said MPEG data stream over said broadcast communication network; and transmitting said MPEG streaming video in said MPEG digital video format in a given program ID of said multi-channel digital television signal over said broadcast communication network to said set-top decoder.

7. A transmitting method in accordance with claim 6, wherein said multi-channel digital television signal is formatted into a plurality of MPEG data packets, said transmitting method further comprising:

generating a control map defining the correspondence between said given URL and said given program ID; and formatting said control map into said MPEG data packets.

8. A transmitting method in accordance with claim 7, wherein said control map further comprises a first table and a second table, each of said plurality of MPEG data packets being identified by a respective packet identifier, said transmitting method further comprising:

transmitting said first table in an MPEG data packet corresponding to a predetermined packet identifier; and transmitting said second table in an MPEG data packet having a packet identifier specified in said first table said second table defining the correspondence between said given URL and said given program ID.

9. A transmitting method in accordance with claim 7, wherein said broadcast communication network includes a return path communication channel from said set-top decoder to said broadcasting station, and wherein said given World Wide Web page further contains a control icon corresponding to a change in running status of said MPEG streaming video, said transmitting method further comprising:

receiving a request from said set-top decoder to said broadcasting station on said return path communication channel to change the running status of said MPEG streaming video;

generating a revised control map at said broadcasting station, said revised control map defining the correspondence between said given URL and said given program ID containing said MPEG streaming video having a changed running status;

formatting said revised control map into said MPEG data packets; and transmitting said MPEG data packets including said revised control map to said set-top decoder.

10. In a broadcast communication network including a broadcasting station for transmitting on a broadcast medium, and a set-top decoder coupled to said broadcast medium, said broadcasting station including an Internet access server for retrieving World Wide Web pages, wherein at least a given World Wide Web page contains a given URL corresponding to streaming video in a first data format, said broadcast communications network further including a multi-channel digital television signal, each program channel of said multi-channel digital television signal being identified by a respective program ID, said broadcasting station including receiving digital data in a standard Internet Protocol over the Internet, said digital data being derived from said given World Wide Web page associated with said streaming video, dividing said digital data in said standard Internet Protocol into a plurality of digital data packets while preserving said standard Internet Protocol, mapping said plurality of digital data packets to the MPEG data packets of an MPEG data stream, storing said streaming video in said first data format corresponding to said given URL at said broadcasting station, transcoding said streaming video from said first data format into an MPEG digital video format at said broadcasting station to form MPEG streaming video, transmitting said MPEG data packets in said MPEG data stream over said broadcast communication network, and transmitting said MPEG streaming video in a given program ID of said multi-channel digital television signal over said broadcast communication network; and at said set-top decoder, a method for displaying said streaming video at said set-top decoder comprising:

receiving said multi-channel digital television signal;

receiving said MPEG data stream containing said MPEG data packets and said plurality of digital data packets at said set-top decoder to recover said digital data in standard Internet Protocol;

displaying said digital data in standard Internet Protocol at said set-top decoder, said digital data corresponding to said given World Wide Web page containing said given URL;

selecting said given URL;

selecting, responsive to selection of said given URL, said given program ID corresponding to said MPEG streaming video; and displaying said MPEG streaming video corresponding to said given program ID, whereby said digital data corresponding to said given World Wide Web page is received in said standard Internet Protocol format, and said streaming video portion corresponding to said given World Wide Web page is received in said MPEG digital video format.

11. A method in accordance with claim 10, wherein said multi-channel digital television signal is formatted into a plurality of MPEG data packets, said broadcasting station including generating a control map defining the correspondence between said given URL and said given program ID, formatting said control map into said MPEG data packets, said method for displaying further comprising:

receiving said MPEG data packets including said control map; and selecting said program ID from said control map corresponding to said given URL.

12. A method in accordance with claim 11, wherein said control map further comprises a first table and a second table, each of said plurality of MPEG data packets being identified by a respective packet identifier, said broadcasting station further transmitting said first table in an MPEG data packet corresponding to a predetermined packet identifier; and transmitting said second table in an MPEG data packet having a packet identifier specified in said first table said second table defining the correspondence between said given URL and said given program ID, said method for displaying further comprising:

receiving said first table in said MPEG data packet corresponding to said predetermined packet identifier;

receiving said second table in said MPEG data packet having said packet identifier specified in said first table; and selecting at said set-top decoder, responsive to said second table, said given program ID.

13. A network method in accordance with claim 11, wherein said broadcast communication network includes a return path communication channel from said set-top decoder to said broadcasting station, and wherein said given World Wide Web page further contains a control icon corresponding to a change in running status of said MPEG streaming video, said method for displaying further comprising:

transmitting a request from said set-top decoder to said broadcasting station on said return path communication channel to change the running status of said MPEG streaming video;

receiving a revised control map from said broadcasting station, said revised control map defining the correspondence between said given URL and said given program ID containing said MPEG streaming video having a changed running status, and selecting, responsive to said revised control map and responsive to said given URL, said program ID corresponding to said MPEG streaming video having a changed running status for display.

14. In a broadcast communication network including a broadcasting station for transmitting on a broadcast medium, and a set-top decoder coupled to said broadcast medium, said broadcasting station including an Internet access server for retrieving World Wide Web pages, wherein at least a given World Wide Web page contains a given URL corresponding to streaming video in a first data format, said broadcast communications network further including a multi-channel digital television signal, each program channel of said multi-channel digital television signal being identified by a respective program ID, an apparatus for displaying said given World Wide Web page containing said streaming video at said set-top decoder, said apparatus comprising:

means for receiving digital data in a standard Internet Protocol over the Internet, said digital data being derived from said given World Wide Web page associated with said streaming video;

means for dividing said digital data in said standard Internet Protocol into a plurality of digital data packets while preserving said standard Internet Protocol;

means for mapping said plurality of digital data packets to the MPEG data packets of an MPEG data stream;

means for storing said streaming video in said first data format corresponding to said given URL at said broadcasting station;

means for transcoding said streaming video from said first data format into an MPEG digital video format at said broadcasting station to form MPEG streaming video;

transmitting said MPEG data packets into said MPEG data stream over said broadcast communication network;

means for transmitting said MPEG streaming video in a given program ID of said multi-channel digital television signal over said broadcast communication network; and at said set-top decoder, means for receiving said multi-channel digital television signal;

means for receiving said MPEG data stream containing said MPEG data packets and said plurality of digital data packets at said set-top decoder to recover said digital data in standard Internet Protocol;

means for displaying said digital data in standard Internet Protocol at said set-top decoder, said digital data corresponding to said given World Wide Web page containing said given URL;

means for selecting said given URL;

means for selecting, responsive to selection of said given URL, said given program ID corresponding to said MPEG streaming video; and means for displaying said MPEG streaming video corresponding to said given program ID;

whereby said digital data corresponding to said given World Wide Web page is broadcast in said standard Internet Protocol format, and said streaming video portion corresponding to said given World Wide Web page is broadcast in said MPEG digital video format.

15. A network apparatus in accordance with claim 14, wherein said multi-channel digital television signal is formatted into a plurality of MPEG data packets, said apparatus further comprising:

means for generating a control map defining the correspondence between said given URL and said given program ID;

means for formatting said control map into said MPEG data packets; and at said set-top decoder, means for receiving said MPEG data packets including said control map; and means for selecting said program ID from said control map corresponding to said given URL.

16. A network apparatus in accordance with claim 15, wherein said control map further comprises a first table and a second table, each of said plurality of MPEG data packets being identified by a respective packet identifier, said apparatus further comprising:
   means for transmitting said first table in an MPEG data packet corresponding to a predetermined packet identifier; and
   means for transmitting said second table in an MPEG data packet having a packet identifier specified in said first table said second table defining the correspondence between said given URL and said given program ID.

17. A network apparatus in accordance with claim 16, further comprising:
   means for receiving said first table in said MPEG data packet corresponding to said predetermined packet identifier;
   means for receiving said second table in said MPEG data packet having said packet identifier specified in said first table; and
   means for selecting at said set-top decoder, responsive to said second table, said given program ID.

18. A network apparatus in accordance with claim 15, wherein said broadcast communication network includes a return path communication channel from said set-top decoder to said broadcasting station, and wherein said given World Wide Web page further contains a control icon corresponding to a change in running status of said MPEG streaming video, said apparatus further comprising:
   means for transmitting a request from said set-top decoder to said broadcasting station on said return path communication channel to change the running status of said MPEG streaming video;
   means for generating a revised control map at said broadcasting station, said revised control map defining the correspondence between said given URL and said given program ID containing said MPEG streaming video having a changed running status;
   means for formatting said revised control map into said MPEG data packets; and at said set-top decoder,
   means for receiving said MPEG data packets including said revised control map; and
   means for selecting, responsive to said revised control map and responsive to said given URL, said program ID corresponding to said MPEG streaming video having a changed running status for display.

19. In a broadcast communication network including a broadcasting station for transmitting on a broadcast medium, and a set-top decoder coupled to said broadcast medium, said broadcasting station including an Internet access server for retrieving World Wide Web pages, wherein at least given World Wide Web page contains a given URL corresponding to streaming video in a first data format, said broadcast communications network further including a multi-channel digital television signal, each program channel of said multi-channel digital television signal being identified by a respective program ID, an apparatus for transmitting said given World Wide Web page containing said streaming video to said set-top decoder, said transmitting apparatus comprising:
   means for receiving digital data in a standard Internet Protocol over the Internet, said digital data being derived from said given World Wide Web page associated with said streaming video;
   means for dividing said digital data in said standard Internet Protocol into a plurality of digital data packets while preserving said standard Internet Protocol;
   means for mapping said plurality of digital data packets to the MPEG data packets of an MPEG data stream;
   means for storing said streaming video in said first data format corresponding to said given URL at said broadcasting station;
   means for transcoding said streaming video from said first data format into an MPEG digital video format at said broadcasting station to form MPEG streaming video;
   means for transmitting said MPEG data packets in said MPEG data stream over said broadcast communication network; and
   means for transmitting said MPEG streaming video in said MPEG digital video format in a given program ID of said multi-channel digital television signal over said broadcast communication network to said set-top decoder.

20. A transmitting apparatus in accordance with claim 19, wherein said multi-channel digital television signal is formatted into a plurality of MPEG data packets said transmitting apparatus further comprising
   means for generating a control map defining the correspondence between said given URL and said given program ID; and
   means for formatting said control map into said MPEG data packets.

21. A transmitting apparatus in accordance with claim 20, wherein said control map further comprises a first table and a second table, each of said plurality of MPEG data packets being identified by a respective packet identifier, said transmitting apparatus further comprising:
   means for transmitting said first table in an MPEG data packet corresponding to a predetermined packet identifier; and
   means for transmitting said second table in an MPEG data packet having a packet identifier specified in said first table said second table defining the correspondence between said given URL and said given program ID.

22. A transmitting apparatus in accordance with claim 20, wherein said broadcast communication network includes a return path communication channel from said set-top decoder to said broadcasting station, and wherein said given World Wide Web page further contains a control icon corresponding to a change in running status of said MPEG streaming video, said transmitting apparatus further comprising:
   means for receiving a request from said set-top decoder to said broadcasting station on said return path communication channel to change the running status of said MPEG streaming video;
   means for generating a revised control map at said broadcasting station, said revised control map defining the correspondence between said given URL and said given program ID containing said MPEG streaming video having a changed running status;
   means for formatting said revised control map into said MPEG data packets; and
   means for transmitting said MPEG data packets including said revised control map to said set-top decoder.

23. In a broadcast communication network including a broadcasting station for transmitting on a broadcast medium, and a set-top decoder coupled to said broadcast medium, said broadcasting station including an Internet access server for retrieving World Wide Web pages, wherein at least a given World Wide Web page contains a given URL corresponding to streaming video in a first data format, said broadcast communications network further including a multi-channel digital television signal, each program channel of said multi-channel digital television signal being identified by a respective program ID, said broadcasting station including means for receiving digital data in a standard Internet Protocol over the Internet, said digital data being derived from said given World Wide Web page associated with said streaming video, means for dividing said digital data in said standard Internet Protocol into a plurality of digital data packets while preserving said standard Internet Protocol, means for mapping said plurality of digital data packets to the MPEG data packets of an MPEG data stream, means for storing said streaming video in said first data format corresponding to said given URL at said broadcasting station, means for transcoding said streaming video from said first data format into an MPEG digital video format at said broadcasting station to form MPEG streaming video, means for transmitting said MPEG data packets in said MPEG data stream over said broadcast communication network, and
- means for transmitting said MPEG streaming video in a given program ID of said multi-channel digital television signal over said broadcast communication network; and at said set-top decoder, an apparatus for displaying said streaming video at said set-top decoder comprising:
- means for receiving said multi-channel digital television signal;
- means for receiving said MPEG data stream containing said MPEG data packets and said plurality of digital data packets at said set-top decoder to recover said digital data in standard Internet Protocol;
- means for displaying said digital data in standard Internet Protocol at said set-top decoder, said digital data corresponding to said given World Wide Web page containing said given URL;
- means for selecting said given URL;
- means for selecting, responsive to selection of said given URL, said given program ID corresponding to said MPEG streaming video; and
- means for displaying said MPEG streaming video corresponding to said given program ID,
- whereby said digital data corresponding to said given World Wide Web page is received in said standard Internet Protocol format, and said streaming video portion corresponding to said given World Wide Web page is received in said MPEG digital video format.

24. An apparatus in accordance with claim 23, wherein said multi-channel digital television signal is formatted into a plurality of MPEG data packets, said broadcasting station including means for generating a control map defining the correspondence between said given URL and said given program ID, means for formatting said control map into said MPEG data packets, said apparatus for displaying further comprising:
- means for receiving said MPEG data packets including said control map; and
- means for selecting said program ID from said control map corresponding to said given URL.

25. An apparatus in accordance with claim 24, wherein said control map further comprises a first table and a second table, each of said plurality of MPEG data packets being identified by a respective packet identifier, said broadcasting station further transmitting said first table in an MPEG data packet corresponding to a predetermined packet identifier; and transmitting said second table in an MPEG data packet having a packet identifier specified in said first table said second table defining the correspondence
- between said given URL and said given program ID, said apparatus for displaying further comprising:
- means for receiving said first table in said MPEG data packet corresponding to said predetermined packet identifier;
- means for receiving said second table in said MPEG data packet having said packet identifier specified in said first table; and
- means for selecting at said set-top decoder, responsive to said second table, said given program ID.

26. A network apparatus in accordance with claim 24, wherein said broadcast communication network includes a return path communication channel from said set-top decoder to said broadcasting station, and wherein said given World Wide Web page further contains a control icon corresponding to a change in running status of said MPEG streaming video, said apparatus for displaying further comprising:
- means for transmitting a request from said set-top decoder to said broadcasting station on said return path communication channel to change the running status of said MPEG streaming video;
- means for receiving a revised control map from said broadcasting station, said revised control map defining the correspondence between said given URL and said given program ID containing said MPEG streaming video having a changed running status, and
- means for selecting, responsive to said revised control map and responsive to said given URL, said program ID corresponding to said MPEG streaming video having a changed running status for display.

* * * * *

UNITED STATES PATENT AND TRADEMARK OFFICE
CERTIFICATE OF CORRECTION

| | | |
|---|---|---|
| PATENT NO. | : 7,089,579 B1 | Page 1 of 1 |
| APPLICATION NO. | : 09/455201 | |
| DATED | : August 8, 2006 | |
| INVENTOR(S) | : Weidong Mao and Wayne E. Hyatt | |

It is certified that error appears in the above-identified patent and that said Letters Patent is hereby corrected as shown below:

Col. 1 lines 3-4, Please insert,
CROSS-REFERENCE TO RELATED APPLICATIONS

This application claims the benefit of U.S. provisional application Serial NO. 60/110,613 filed December 20, 1998

Signed and Sealed this

Sixth Day of February, 2007

JON W. DUDAS
*Director of the United States Patent and Trademark Office*